United States Patent [19]
Riedl

[11] Patent Number: 5,010,778
[45] Date of Patent: Apr. 30, 1991

[54] VIBRATOR

[75] Inventor: Franz Riedl, Munich, Fed. Rep. of Germany

[73] Assignee: Wacker-Werke GmbH & Co. KG, Munich, Fed. Rep. of Germany

[21] Appl. No.: 442,321

[22] PCT Filed: Mar. 3, 1989

[86] PCT No.: PCT/EP89/00222

§ 371 Date: Oct. 26, 1989

§ 102(e) Date: Oct. 26, 1989

[87] PCT Pub. No.: WO89/07988

PCT Pub. Date: Sep. 8, 1989

[30] Foreign Application Priority Data

Mar. 3, 1988 [DE] Fed. Rep. of Germany ....... 3806897

[51] Int. Cl.[5] ........................ F16H 33/02; B01F 11/00
[52] U.S. Cl. ........................................ 74/61; 366/128
[58] Field of Search ........................ 74/61, 87; 173/49; 209/367; 366/128; 404/117

[56] References Cited

U.S. PATENT DOCUMENTS 4,356,736 11/1982 Riedl ........................................ 74/61

FOREIGN PATENT DOCUMENTS 1078058 10/1957 Fed. Rep. of Germany .
1285777 12/1968 Fed. Rep. of Germany .
2625696 12/1977 Fed. Rep. of Germany ........ 173/49
210002 1/1968 U.S.S.R. ................................ 173/49

*Primary Examiner*—Allan D. Herrmann
*Assistant Examiner*—David W. Laub
*Attorney, Agent, or Firm*—Robert W. Becker & Associates

[57] ABSTRACT

A vibrator including two axially parallel, interlocking, counterrotating unbalanced shafts. Both the phase relationship of the unbalanced shafts, and hence the direction of the vector of the directed vibrations, and the value of m.r., and hence the displacement of the vibrations of the compaction element connected to the vibrator, are variable. To this end, the unbalanced shafts are coupled by a hub that is disposed in a rotatable yet axially fixed manner on one of the unbalanced shafts and that has, in the wall surrounding the shaft, a groove that extends along the unbalanced shaft. A pin that is fixedly secured to the unbalanced shaft and that can be adjusted by a servomotor engages slidingly in the groove. The direction of operation of the driven unbalanced shaft is reversible. Each unbalanced shaft has an eccentric part that is fixedly mounted thereon and an eccentric part that is freely rotatable thereon over a predetermined angular range between extreme positions that are delimited by stops. The servomotor is double acting.

2 Claims, 3 Drawing Sheets

Fig. 2
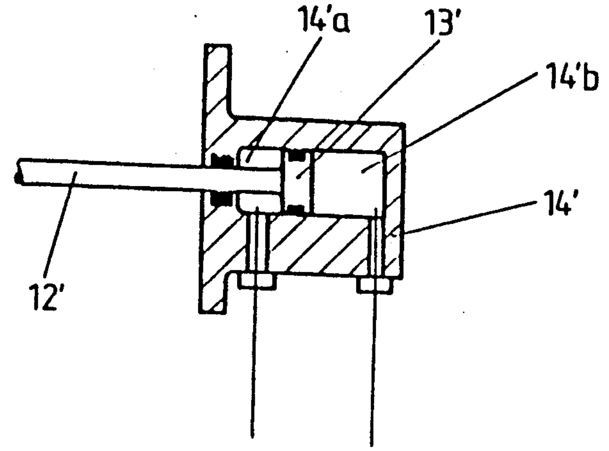
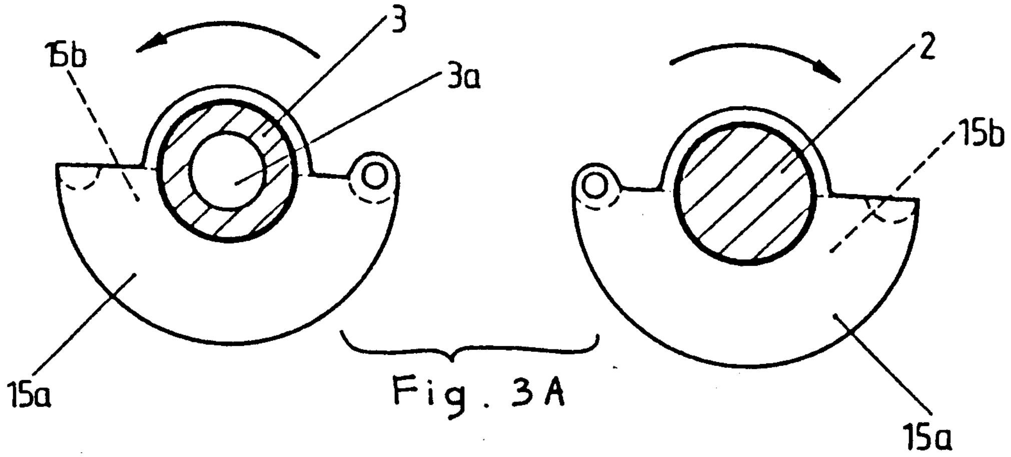
Fig. 3A
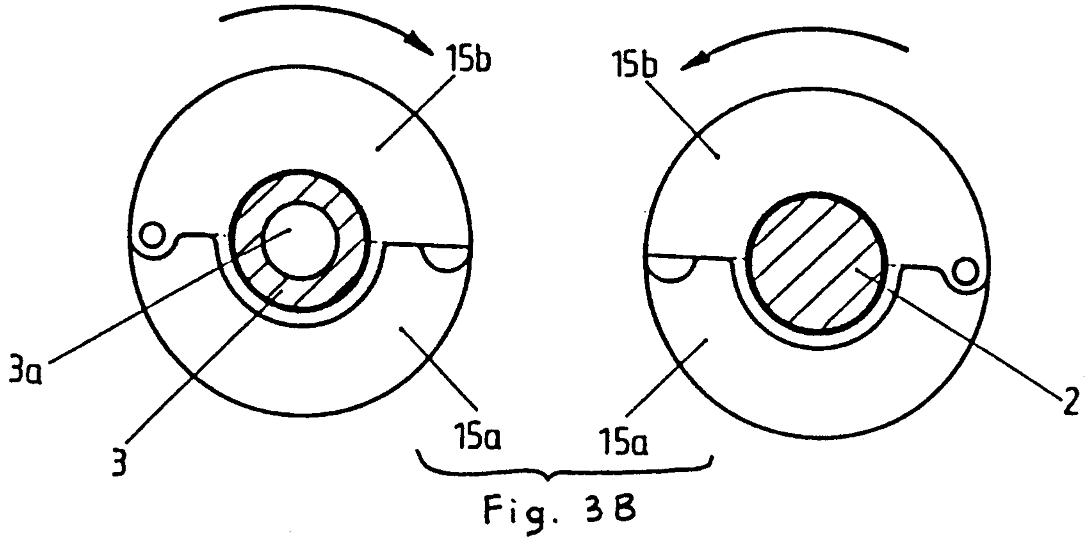
Fig. 3B

VIBRATOR

The present invention relates to a vibrator having two axially parallel, interlocking, counterrotating unbalanced shafts, one of which is driven by a drive motor, with the unbalanced shafts, for continuous opposite rotation for altering the phase relationship of eccentrics, being coupled via a hub that is disposed in a rotatable yet axially fixed manner on one of the unbalanced shafts and that in a wall thereof that surrounds the one shaft is provided with a groove that extends along the one shaft and in which slidingly engages a pin that is fixedly secured to the one shaft and that, in a slot of the one shaft that extends therealong and at an angle to the hub groove, is displaceable via an adjustment member that is disposed coaxially in the one shaft and is randomly actuatable via a servomotor.

BACKGROUND OF THE INVENTION

Vibrators of this type are known applicant's U.S. Pat. No. 4,356,736, Franz Riedl, issued Nov. 2, 1982.

Although with the known vibrator the frequency of the excited' oscillation can be varied by changing the speed of the drive motor and the direction of the vector of the directed vibration by shifting the pin relative to the hub groove, the m.r value is prescribed as a constant. It is frequently desired to be able to operate not only with a selectable, prescribed vibration frequency and a selectable, prescribed vibration direction, but also with a selectable, prescribed displacement of the vibration, at least between two different values, of the compaction element that is connected to the vibrator. The displacement "s" of the vibration is a function of the mass M of the compaction element and the mr value of the vibrator pursuant to the equation $$s = 2\cdot\frac{m.r.}{M}$$

where "m" is the vibrationally effective mass of the exciter and "r" is the distance of the center of gravity of this mass from the central axis of the unbalanced shaft.

It is an object of the present invention to provide a vibrator of the aforementioned general type where also the m.r value can be varied between a predetermined minimum value and a predetermined maximum value.

SUMMARY OF THE INVENTION

The aforementioned object is realized by the following: the direction of operation of the driven shaft is reversible; each of the unbalanced shafts has an eccentric part that is fixedly mounted thereon and has an eccentric part that is freely rotatable thereon over a predetermined angular range between extreme positions that are delimited by stop means which, relative to the fixed eccentric part, are disposed in such a way that the entire eccentric, comprised of a fixed eccentric part and the movable eccentric part, in one extreme position of the movable eccentric part has a maximum value and in the other extreme position has a minimum value, with the rotatable eccentric parts on both unbalanced shafts each assuming the same extreme position, which is a function of the direction of operation; and the servomotor is double acting.

With the inventive vibrator, the freely rotatable eccentric parts on the two unbalanced shafts, depending upon the direction of operation thereof, are disposed either respectfully against the one or the other stop, and in particular from unbalanced shaft to unbalanced shaft respectively against stops that correspond with one another for the same m.r value of the individual shafts, so that for a given direction of operation, relative to the directed vibration, a maximum resultant m.r value is obtained and for the other direction of operation a minimum m.r value is obtained, without this having an impact upon the direction of vibration that is selected via the position of the pin relative to the hub groove.

It is also an object of the present invention to embody a vibrator according to the invention in such a way that the double-acting servomotor can be integrated into the vibrator accompanied by a minimum requirement of space. This is achieved in that the double-acting servomotor comprises two single-acting servomotors having opposite directions of operation, with one of the servomotors engaging the adjustment member from one end of the one unbalanced shaft, and with the other of the servomotors engaging the adjustment member from the other end of the one unbalanced shaft. This space-saving installation can be enhanced still further if the servomotor or servomotors are hydraulic working cylinders. The cylinder spaces of the single-acting working cylinders can extend at least partially into the one unbalanced shaft.

BRIEF DESCRIPTION OF THE DRAWINGS

The invention will be described in greater detail in conjunction with the exemplary embodiment illustrated in the drawing.

The drawing shows:

FIG. 2 is a view that shows an embodiment, modified from that shown in FIG. 1, of the double-acting servomotor for random actuation of the adjustment member, FIGS. 3A, 3B, 4A–4C, and 5A–5C are respective schematic illustrations of the relative position of the eccentric masses for different directions of rotation of the unbalanced shaft and different angular positions upon the latter.

DESCRIPTION OF PREFERRED EMBODIMENTS

Figure 1:
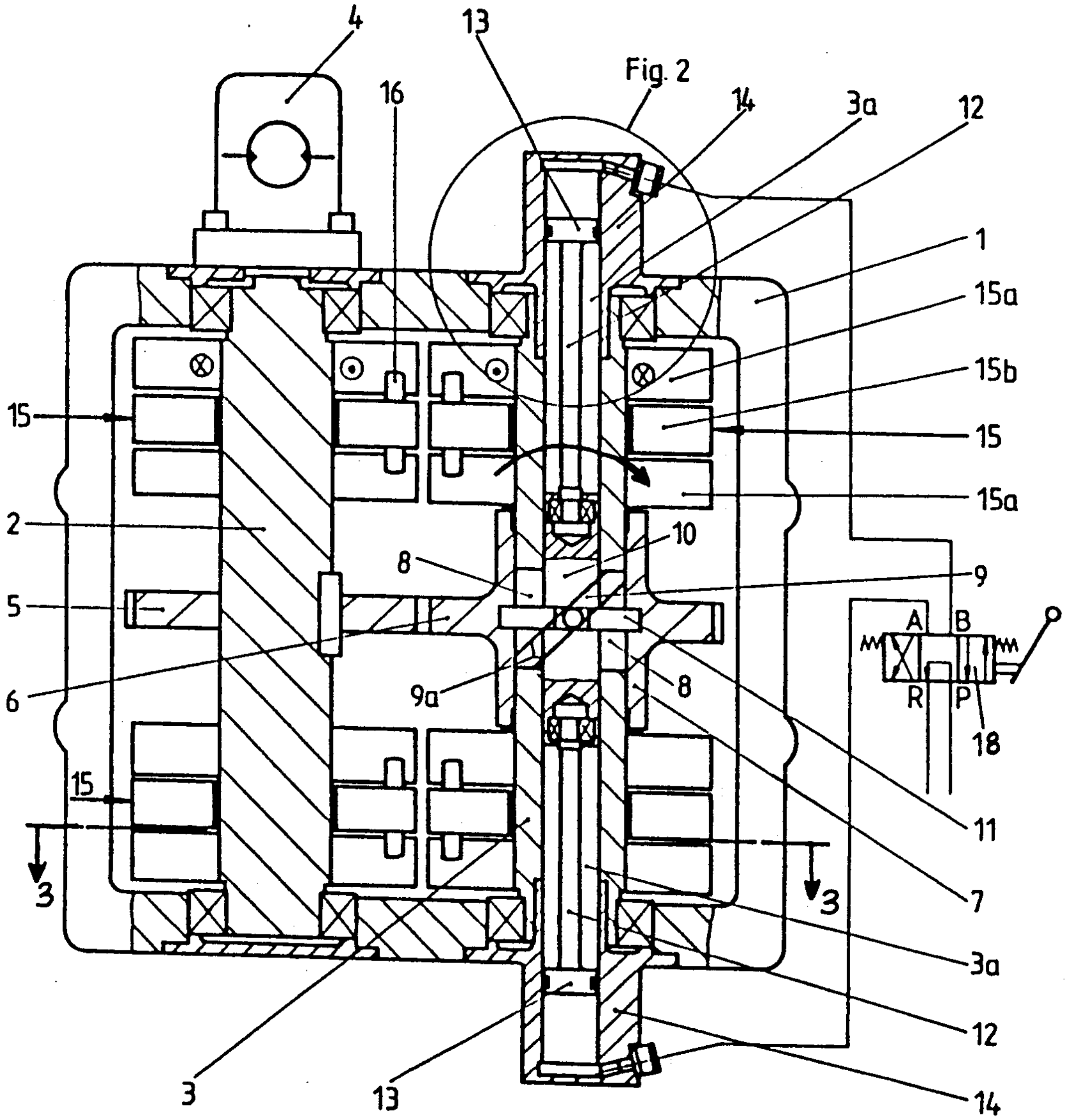
FIG. 1 is a partially cross-sectioned plan view of a vibrator, taken parallel to the plane of the drawing sheet through the central axes of the unbalanced shafts.

The vibrator of FIG. 1 has a housing 1 in which two unbalanced shafts 2 and 3 are rotatably mounted parallel to one another. The unbalanced shaft 2 can be driven by means of a hydraulic motor 4 and carries halfway along its length a gear wheel 5 that is fixedly connected to the shaft. Rotatably yet axially nondisplaceably disposed approximately halfway along the length of the unbalanced shaft 3 is a hub 7 that is surrounded by a gear wheel 6 that is rigidly connected with the hub. The gear wheel 6 meshes with the gear wheel 5. The unbalanced shaft 3 is embodied as a hollow shaft and is provided in the region of the hub with oppositely disposed slots that extend parallel to one another and parallel to the shaft orientation, and pass through the wall of the shaft. The hub 7 has a groove 9 that is preferably helical and extends over the length of the slots 8, yet at an angle thereto. This is schematically indicated by the two parallel lines 9*a* in FIG. 1.

An adjustment member 10 can slide in the hollow space 3*a* of the shaft 3 in the region of the hub 7; the adjustment member is provided with a pin 11 that extends at right angles to the axis of the shaft and that extends through the longitudinal slots 8 with a sliding fit, with the ends of the pin extending slidably into the hub groove 9.

The adjustment member 10 is randomly displaceable via a double acting hydraulic servomotor in the axial direction of the shaft 3. In the embodiment illustrated in FIG. 1, this servomotor includes two piston rods 12 that extend through the shaft, engage against one or the other side of the adjustment member 10, and are rotatably connected therewith. Toward the outer ends of the shaft, the piston rods end in pistons 13 that are rigidly connected with the piston rods. The pistons in turn are slidably disposed in a cylinder 14 that is disposed on the housing 1 opposite one or the other end of the shaft 3. When one of the pistons 13 moves toward the inside of the shaft in its cylinder 14, it shifts the other piston rod 12, with its piston 13, toward the outside of the shaft via the pertaining piston rod 12 and the adjustment member 10, so that the entire piston/cylinder arrangement functions like a double acting working cylinder. With the thereby accompanying displacement of the adjustment member 10, the angular position between the hub 7 and the unbalanced shaft 3 is altered by the pin 11. This is tantamount to a change of the relative angular position between the unbalanced shafts 2 and 3 due to the rotationally synchronous connection between the unbalanced shaft 2 and the hub 3 provided by the gear wheels 5 and 6.

The unbalanced shaft 3 is provided on both sides of the hub 7 with split imbalances or eccentrics 15. Each eccentric 15 comprises two imbalance or eccentric parts **15*a* that are disposed on the outer sides and are fixedly connected with the unbalanced shaft 3, and an imbalance or eccentric part 15*b* that is disposed therebetween, is rotatably mounted on the unbalanced shaft 3, and is provided with a stop pin 16 that cooperates with the counter abutment faces of the eccentric parts 15*a* and limits the rotatability of the eccentric part 15*b* to approximately 180° relative to the eccentric parts 15*a*, which are fixedly connected with the shaft. Between these extreme positions, the eccentric part 15*b* is freely rotatable relative to the eccentric parts 15*a*, so that between the eccentric part 15*b* and the eccentric parts 15*a* only a single drag connection can exist which is imparted by the stop pin 16. In one extreme position, the central eccentric part 15*b*, as illustrated in FIG. 1, is shoved in between the eccentric parts 15*a* and thereby increases the effective eccentric mass of the eccentric 15, whereas in the other extreme position, the eccentric part 15*b* is rotated out from between the eccentric parts 15*a* and thus reduces the effective eccentric mass. Which of the two extreme positions the central eccentric part 15*b* assumes relative to the outer eccentric parts 15*a* depends upon the direction of rotation of the unbalanced shaft 3. The position indicated in FIG. 1 results when the unbalanced shaft 3 rotates in the direction indicated in FIG. 1 with the uppermost right eccentric part 15*a*, while the other extreme position where the eccentric part 15*b* is rotated out from between the eccentric parts 15*a* is obtained by rotating the unbalanced shaft 3** in the opposite direction.

To facilitate illustration, only the eccentric 15 shown in the upper right in FIG. 1 is provided with reference numerals. However, the described relationships and reference symbols also apply for the other eccentric 15 as well as for corresponding eccentrics 15 of similar construction and mass that are disposed in the same longitudinal position upon the unbalanced shaft 2.

Since the unbalanced shafts 2 and 3 rotate in opposite directions due to the coupling via the gear wheels 5 and 6, the eccentrics 15 each have the same setting with regard to the relative position of their central eccentric part **15*b* relative to the two outer eccentric parts 15*a*. The eccentric parts 15*b* are therefore all either rotated in between the eccentric parts 15*a* or are rotated out from between them, so that the eccentrics 15 relative to one another also always have the same effective mass, i.e. depending upon the direction of shaft rotation, either the maximum value or the minimum value. However, their relative phase relationship from one unbalanced shaft to the other depends upon the variable phase relationship between the hub 7 and the unbalanced shaft 3**.

The direction of rotation of the unbalanced shafts 2 and 3 depends upon the reversible direction of rotation of the hydraulic motor 4, which can also be provided with a variable speed. To shift the adjustment member 10, pressure medium is supplied to one of the cylinders and at the same time pressure medium is withdrawn from the other cylinder. Depending upon which of the two cylinders 14 is supplied with pressure, the displacement takes place in one or the other direction. Thus, in contrast to the position illustrated in FIG. 1, the phase shift of the unbalanced shaft 3 that can be achieved relative to the hub 7, and hence the phase shift of the eccentrics 15 disposed on the shaft relative to the eccentrics 15 on the unbalanced shaft 2 in a positive or negative sense depends upon the length and the slope of the hub groove 9 on both sides of the illustrated middle position.

The supply and withdrawal of pressure medium to and from the cylinders 14 can be controlled by a control valve 18 that has three operating positions and that connects the pressure line and the return line of a pressure medium source in a variable manner with the connections on the cylinders 14 in the manner illustrated in FIG. 1 in a parallel or crosswise manner, and in the middle position completely separates these lines from the cylinder connections, as a result of which the pistons 13, and therewith the adjustment member 10, are hydraulically secured in position after a desired setting is achieved.

FIG. 2 shows a variation of the double acting hydraulic servomotor. With this embodiment, only a single piston rod 12' is provided that is guided from only one side through the hollow unbalanced shaft 3 to the adjustment member 10 and is rotatably connected therewith and ends in a piston 13' that in a cylinder having two pressure medium chambers can be shifted as a partition between the cylinder chambers **14'*a* and 14'*b*. Depending upon the desired direction of movement of the piston rod 12', the supply of pressure medium takes place into one or the other cylinder chamber, whereas the respectively other cylinder chamber is connected for discharge. The control can be provided by a pressure medium control valve that is constructed in the same manner as the pressure medium control valve 18 shown in FIG. 1**.

The end views of FIG. 3 show the positions of the central eccentric part **15*b* at given directions of rotation relative to the pertaining eccentric parts 15*a*. The cross-sectional views are taken along the section line 3—3 in FIG. 1**.

Figure 4A:
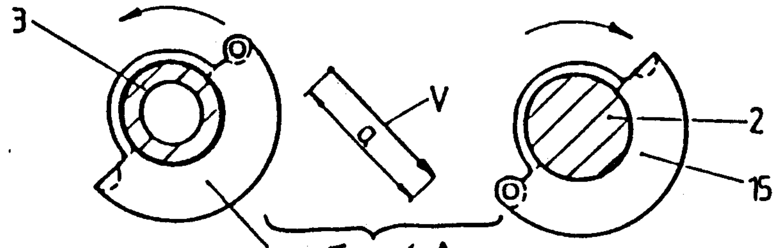
Figure 4B:
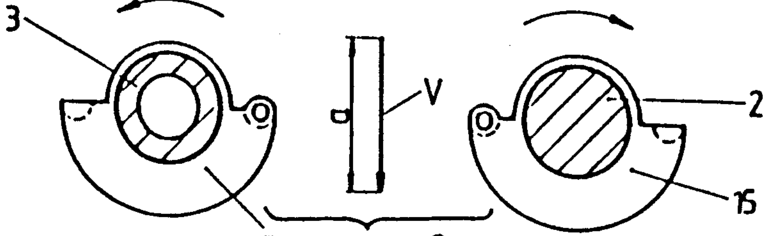
Figure 4C:
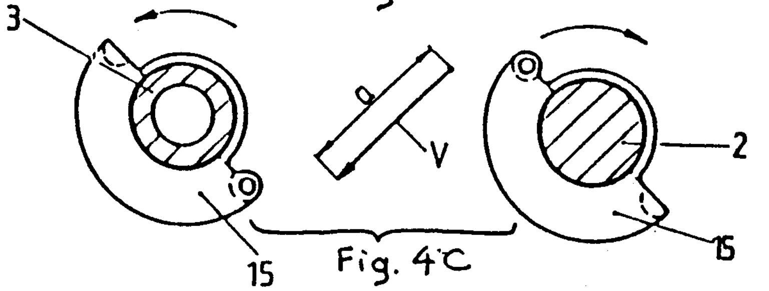
Figure 5A:
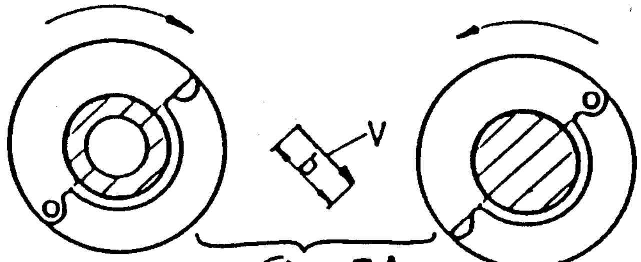
Figure 5B:
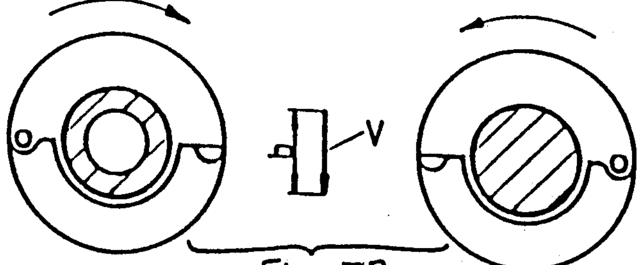
Figure 5C:
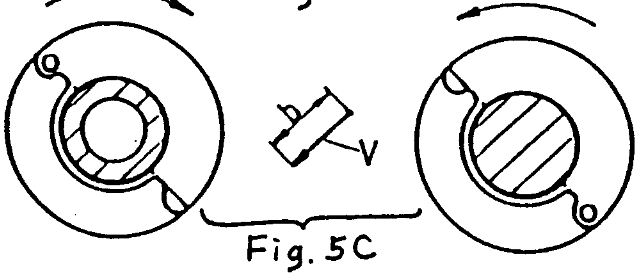

For the one or other of the two directions of rotations indicated in FIG. 3, FIGS. 4 and 5 represent the magnitude and direction of three different phase relationships, which can be selected by the adjustment member 10, between the unbalanced shafts 2 and 3 and the pertaining vector V of the resultant directed vibrations. The vector direction can be continuously varied, while the vector magnitude can assume only two prescribed fixed values at a fixed speed and prescribed eccentric. Values that deviate herefrom can be achieved only via an increase or reduction in speed relative to the aforementioned fixed speed. A lot of compression or compaction work requires a predetermined vibrator frequency, and the possibility of this connection being able to work with various m.r values is of great advantage. The present invention is, of course, in no way restricted to the specific disclosure of the specification and drawings, but also encompasses any modifications within the scope of the appended claims.

What I claim is:

1. In a vibrator having two axially parallel, interlocking, counterrotating unbalanced shafts, one of which is driven by a drive motor, with said unbalanced shafts, for continuous opposite rotation for altering the phase relationship of eccentrics, being coupled via a hub that is disposed in a rotatable yet axially fixed manner on one of said unbalanced shafts and that in a wall thereof that surrounds said one shaft is provided with a groove that extends along said one shaft and in which slidingly engages a pin that is fixedly secured to said one shaft and that, in a slot of said one shaft that extends therealong and at an angle to said hub groove, is displaceable via an adjustment member that is disposed coaxially in said one shaft and is randomly actuatable via a servomotor means, the improvement wherein:

the direction of operation of said driven shaft is reversible;

each of said unbalanced shafts has an eccentric part that is fixedly mounted thereon and has an eccentric part that is freely rotatable thereon over a predetermined angular range between extreme positions that are delimited by stop means which, relative to said fixed eccentric part, are disposed so that the entire eccentric, comprised of said fixed eccentric part and said movable eccentric part, in one extreme position of said movable eccentric part has a maximum value and in the other extreme position has a minimum value, with the rotatable eccentric parts on both unbalanced shafts each assuming the same extreme position, which is a function of the direction of operation; and said servomotor means is double acting and comprises two single-acting servomotors having opposite directions of operation, with one of said servomotors engaging said adjustment member from one end of said one unbalanced shaft, and with the other of said servomotors engaging said adjustment member from the other end of said one unbalanced shaft.

2. A vibrator according to claim 1, in which said two single-acting servomotors are hydraulic working cylinders having cylinder spaces that extend at least partially into said one unbalanced shaft.

* * * * *